United States Patent
Almoric et al.

(10) Patent No.: US 8,853,110 B2
(45) Date of Patent: Oct. 7, 2014

(54) ARSENIC-FREE SPINEL GLASS-CERAMICS WITH HIGH VISIBLE TRANSMISSION

(75) Inventors: Etienne Almoric, Fontainebleau (FR); Marie Jacqueline Monique Comte, Fontenay aus Roses (FR)

(73) Assignee: Corning Incorporated, Corning, NY (US)

( * ) Notice: Subject to any disclaimer, the term of this patent is extended or adjusted under 35 U.S.C. 154(b) by 347 days.

(21) Appl. No.: 13/288,078

(22) Filed: Nov. 3, 2011

(65) Prior Publication Data
US 2012/0114955 A1 May 10, 2012

(30) Foreign Application Priority Data
Nov. 4, 2010 (EP) .................... 10306207

(51) Int. Cl.
C03C 10/02 (2006.01)
C03C 10/00 (2006.01)
C03C 3/085 (2006.01)
C03C 4/10 (2006.01)

(52) U.S. Cl.
CPC ......... *C03C 10/0036* (2013.01); *C03C 10/0045* (2013.01); *C03C 3/085* (2013.01); *C03C 4/10* (2013.01); *C03C 10/0054* (2013.01)
USPC ............... 501/10; 65/33.9; 428/426

(58) Field of Classification Search
None
See application file for complete search history.

(56) References Cited

U.S. PATENT DOCUMENTS

| | | | | |
|---|---|---|---|---|
| 3,681,102 A | * | 8/1972 | Beall | 501/10 |
| 5,476,821 A | | 12/1995 | Beall et al. | 501/10 |
| 5,968,857 A | | 10/1999 | Pinckney | 501/10 |
| 2005/0096208 A1 | | 5/2005 | Zachau et al. | |

FOREIGN PATENT DOCUMENTS

DE   102004024022 A1   12/2005

OTHER PUBLICATIONS

Pinckney, L.R., "Transparent, High Strain Point Spinel Glass-Ceramics", Journal of Non-Crystal Solids, (1999), 255, pp. 171-177.

* cited by examiner

*Primary Examiner* — David Sample
(74) *Attorney, Agent, or Firm* — Michael W Russell

(57) ABSTRACT

A transparent glass-ceramic materials contains a spinel solid solution as the main crystalline phase and is free of $As_2O_3$ and $Sb_2O_3$. Corresponding precursor alumino-silicate glasses, articles made of said transparent glass-ceramic materials as well as a method for manufacturing such articles, and structures comprising a sheet made of such glass-ceramic materials and electronic or optoelectronic devices comprising such structures are also disclosed. Some materials disclosed can be used as substrates for high temperature growth of high quality monocrystalline or polycrystalline silicon thin films. Structures including such substrates with such thin films thereon can be used in photovoltaic devices, flat panel devices and liquid crystal devices.

12 Claims, 1 Drawing Sheet

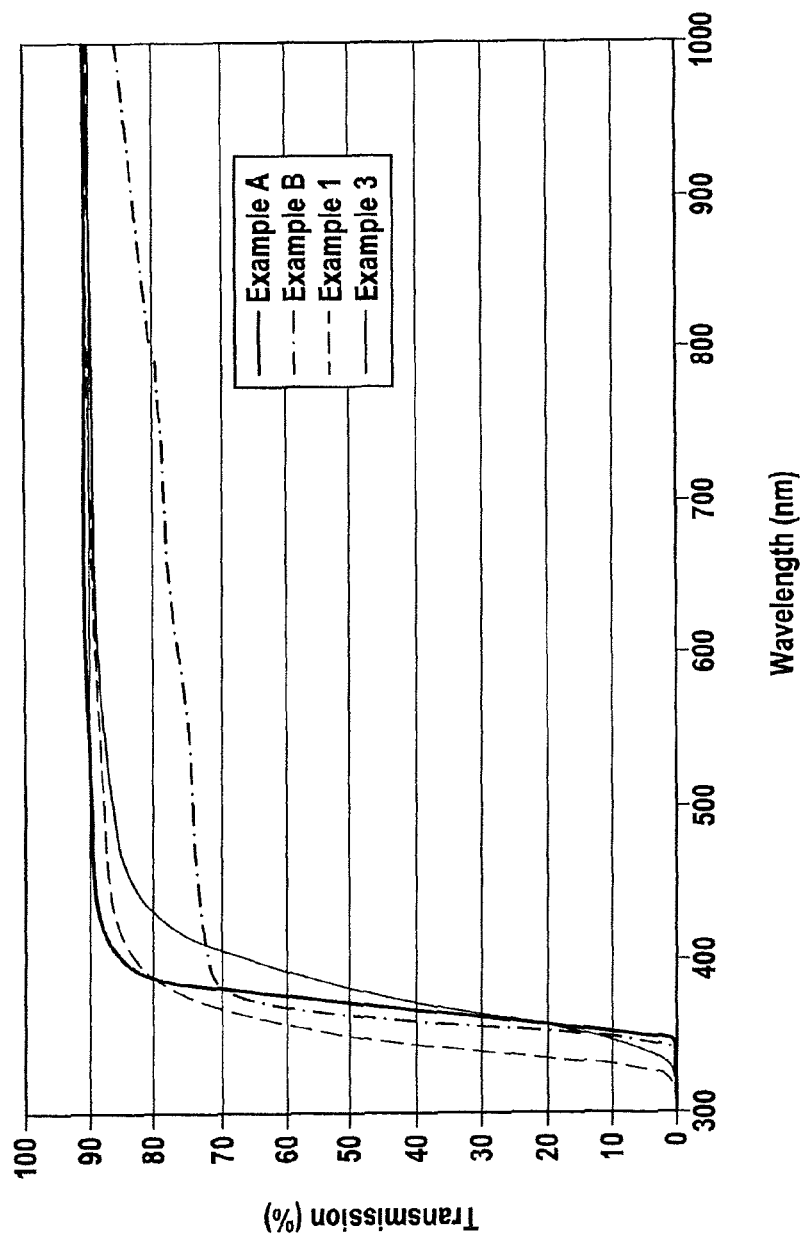

ARSENIC-FREE SPINEL GLASS-CERAMICS WITH HIGH VISIBLE TRANSMISSION

CROSS-REFERENCE TO RELATED APPLICATION(S)

This application claims the benefit of priority under 35 U.S.C. §119 of European Patent Application Serial No. 10306207.1 filed on Nov. 4, 2010, the content of which is relied upon and incorporated herein by reference in its entirety.

STATEMENT REGARDING SPONSORED RESEARCH

This invention was funded in part by a grant from "Agence Nationale de la Recherche" under grant ANR-07-PSPV-004-05 for the POLYSIVERRE project under the program "Solaire Photovoltaïque."

BACKGROUND

The present disclosure relates to transparent glass-ceramic materials which contain a spinel solid solution as the main crystalline phase, corresponding precursor alumino-silicate glasses, articles made of said transparent glass-ceramic materials as well as a method for manufacturing such articles, and structures comprising a sheet made of such glass-ceramic materials and electronic or optoelectronic devices comprising such structures.

The transparent spinel glass-ceramics display a high transmission in the 400-1000 nm range and are environmentally friendly (free of arsenic and antimony). They are industrially obtained in an easy way insofar as their precursor alumino-silicate glasses show suitable liquidus (low temperature of liquidus and high viscosity at this temperature).

Some transparent spinel glass-ceramics also display interesting strain points and coefficient of thermal expansion. They are suitable substrates for high temperature growth of high quality monocrystalline or polycrystalline silicon thin films for example. Structures including such substrates with such thin films thereon can be used in photovoltaic devices, flat panel devices and liquid crystal devices.

Spinel glass-ceramics have been disclosed in numerous prior art documents.

U.S. Pat. No. 3,681,102 discloses transparent glass-ceramic articles comprising zinc spinel. The composition of the precursor glasses contains $ZrO_2$ as a nucleating agent and, conventionally, a fining agent such as $As_2O_3$ may be included in the batch materials.

U.S. Pat. No. 4,687,750 relates to transparent glass-ceramics containing gahnite. The composition of the precursor glasses contains $TiO_2$ as nucleating agent. Minor amounts of $ZrO_2$ may be included in the composition without adversely affecting the properties of the crystallized products. Nonetheless it is explained that $ZrO_2$ is unnecessary as a nucleating agent as $TiO_2$ is a much more efficient nucleating agent. Moreover $ZrO_2$ is much less soluble than $TiO_2$ in the glass, hence its presence hazards unmelted particles and/or devitrification in the glass and requires higher melting temperature. To improve glass quality, a fining agent such as $As_2O_3$ and/or $Sb_2O_3$ may be added to the batch.

U.S. Pat. No. 5,476,821 describes high modulus glass-ceramics containing fine grained spinel-type crystals. Nucleation efficiency is enhanced by the presence of components such as $TiO_2$, $ZrO_2$ and NiO, and also high levels of $Al_2O_3$.

U.S. Pat. No. 5,968,857 describes transparent glass-ceramics containing spinel as a predominant crystal phase. The composition of the precursor glasses contains $TiO_2$ and/or $ZrO_2$ as nucleating agents. Fining agents such as $As_2O_3$ or $Sb_2O_3$ may be added to said precursor glass compositions.

L. R. Pinckney, the inventor of said U.S. Pat. No. 5,968,857, has also disclosed such transparent spinel glass-ceramics which display high strain point in the Journal of Non-Crystalline Solids, 255 (1999), pp. 171-177. The described glass-ceramics are able to withstand thermal treatments at 1000° C. without deformation. L. R. Pinckney has observed that precursor glasses melted with $TiO_2$ (but without arsenic) leads to glass-ceramics showing a gray color and so having a low transmission in all the visible range. Such a low transmission is an impediment to the use of these glass-ceramics in photovoltaic applications and the like as it reduces the amount of light which is able to reach the silicon. L. R. Pinckney suggests that a partial reduction of titanium in $Ti^{3+}$ is responsible for the very strong absorption in the visible. Actually, it appears that, in addition to its fining effect, arsenic also plays a role of bleaching agent.

U.S. Patent Application No. 2005/0096208 describes glass-ceramics containing spinel, sapphirine or cordierite as a main crystalline phase. Said glass-ceramics can be obtained in forming precursor glasses by the float method and then by ceramming the formed glasses. $B_2O_3$ is an essential component of the composition of the precursor glasses. $P_2O_5$, $TiO_2$, $ZrO_2$, $SnO_2$ and $Ta_2O_5$ are proposed as nucleating agents. $SnO_2$ is also proposed as fining agent.

WO Patent Application 2007/144875 also describes glass-ceramics containing spinel as a main crystalline phase. $TiO_2$ is disclosed as a preferred nucleating agent. It may be used in a large amount.

BRIEF DESCRIPTION OF THE DRAWING

The FIGURE shows complete transmission curves (as a function of wavelength) of comparative examples A and B and inventive examples 1 and 3.

DETAILED DESCRIPTION

In such a context, the inventors have considered the technical problem of providing spinel glass-ceramics (i) free of any toxic fining agent (free of $As_2O_3$ and $Sb_2O_3$), (ii) showing a high transmission in the visible and near IR (such a high transmission is very important in the case of photovoltaic or equivalent applications: the glass-ceramic used as superstrate so allows a maximum of solar energy to reach the silicon layer), i.e. showing (under a thickness of 1 mm) a transmission of at least 50% for any wavelength in the 400-450 nm range (preferably higher than 70% for any wavelength in the 400-450 nm range), higher than 80% for any wavelength in the 450-520 nm range and higher than 85% for any wavelength in the 520-1000 nm range, and (iii) for which the precursor glasses display a liquidus lower than 1500° C. and a viscosity at the liquidus higher than 700 dPa·s. This is obviously in reference to an easy forming of said precursor glasses.

Advantageously, the transparent spinel glass-ceramics disclosed herein also display a high strain point (higher than 850° C., more preferably higher than 875° C. and most preferably higher than 900° C.), as well as a CTE in the 30-40× $10^{-7} K^{-1}$ range (25-300° C.). Said advantageous characteristics are particularly advantageous if the glass-ceramics are aimed to be used as substrates for layer(s) made of a semiconductor, especially for crystalline silicon layer(s). Therefore, their CTE provides a relatively close thermal match to silicon, and their high strain point allows to be used them as a substrate to make high quality crystalline silicon by growth at high temperature (>850° C.).

We incidentally note here that the glass-ceramics disclosed herein have more particularly been developed in reference to the five above stipulations (so as to be particularly suitable as substrate for layer(s) made of a semi-conductor, especially for crystalline silicon layer(s)) but that the disclosure also encompasses glass-ceramics complying with only the first three stipulations and usable in others contexts. Such transparent spinel glass-ceramics are easily obtained, free of toxic fining agent and are per se interesting.

Tin oxide is known as a possible substitute to arsenic for fining in alumino-silicate glasses. However, it was not at all obvious to have tin oxide in the composition of glass-ceramics, said glass-ceramics obtained from a precursor glass with a suitable liquidus and said glass-ceramics having a high transmission. As explained above, the removal of arsenic leads to a strong absorption in the visible range and the removal of titanium oxide and its replacement by zirconium oxide leads to transparent material but with an inacceptable liquidus (>1500° C.). Moreover, titanium containing glass-ceramics tend to have a strong absorption in the 400-450 nm range, probably due to the existence of a charge transfer between titanium and iron brought as an impurity by the raw materials. This absorption is enhanced when tin oxide is added.

The inventors have actually surprisingly discovered that the co-presence of $TiO_2$ and $ZrO_2$ as nucleating agents together with a low level of iron allow the use of $SnO_2$ as substitute for $As_2O_3$ in the obtaining of suitable transparent spinel glass-ceramics.

Therefore, disclosed herein is a transparent glass-ceramic material, free of As and Sb and containing a spinel solid solution as the main crystalline phase. Characteristically the composition of said material (expressed in percentages in weight) is free of $As_2O_3$ and $Sb_2O_3$, with the exception of unavoidable trace thereof, and comprises $SnO_2$, $TiO_2$ and $ZrO_2$, and less than 100 ppm of $Fe_2O_3$.

A transparent material here means a material showing a transmission of at least 50% for any wavelength in the 400-450 nm range (preferably higher than 70% for any wavelength in the 400-450 nm range), higher than 80% for any wavelength in the 450-520 nm range and higher than 85% for any wavelength in the 520-1000 nm range, such a transmission being measured through a thickness of 1 mm of material.

The main crystalline phase observed in the material is a spinel solid solution of formula $(Zn,Mg)Al_2O_4$ (being it not impossible that other elements like titanium or iron enter in the solid solution). It represents at least 75% (in weight %) of the crystalline matter. Other crystalline phases present within the material of the invention could be for example srilankite or quartz. The mean size of the spinel crystalites is typically lower than 10 nm.

Characteristically, the composition of the material includes $SnO_2$ as fining agent, both $TiO_2$ and $ZrO_2$ as nucleating agents, and less than 100 ppm of $Fe_2O_3$, to generate a spinel glass-ceramic with a high transmission.

Advantageously, the four above identified components are present in the weight composition within the below indicated ranges:

0.1-2 (preferably 0.15-0.8) % of $SnO_2$,
2-4 (preferably 2-3) % of $TiO_2$,
3-4.5% of $ZrO_2$, and
less than 100 ppm of $Fe_2O_3$.

$SnO_2$ is efficient as fining agent. It seems also to play a role as nucleating agent and help to limit the level of titanium oxide. It is advantageously present at the indicated level of 0.1-2 wt. %, and it is very advantageously present at the indicated level of 15-0.8 wt. %. The fining efficiency and the absorption both increase with the tin oxide level.

$TiO_2$ is advantageously present (very advantageously present) within the indicated ranges. It has to be efficient enough as nucleating agent (otherwise the material is not transparent) and not responsible of a strong absorption.

$ZrO_2$ is advantageously present within the indicated range. It has to be efficient enough as nucleating agent and not responsible of devitrification. The disclosed glasses display liquidus temperature lower than 1500° C. and a viscosity at the liquidus higher than 700 dPa·s The combination of the indicated ranges of $TiO_2$ and $ZrO_2$ is particularly suitable. It has to be noted that the indicated preferred ranges (very advantageous variants) for $SnO_2$ and $TiO_2$ are independent one from the other.

Iron is an impurity which may be introduced by the raw materials. Iron can be present at a concentration of less than 100 ppm to limit absorption. Its level is advantageously less than 80 ppm, very advantageously it is less than 60 ppm.

According to a preferred variant, the glass-ceramic materials have a composition, expressed in percentage by weight of oxide, which essentially consists of:

| | |
|---|---|
| $SiO_2$ | 45-65 |
| $Al_2O_3$ | 14-28 |
| ZnO | 4-13 |
| MgO | 0-8 |
| with ZnO + MgO | ≥8 |
| BaO | 0-8 |
| $SnO_2$ | 0.1-2 |
| $TiO_2$ | 2-4 |
| $ZrO_2$ | 3-4.5 |
| $Fe_2O_3$ | <100 ppm. |

It is indicated that the composition "essentially consists of" the given list of compounds (oxides). This means that in the glass-ceramic materials according, the sum of the listed compounds (oxides) represents at least 95 weight %, generally at least 98 weight %. It cannot be excluded that other compounds may be found in low quantities in said glass-ceramic materials (obviously any other compounds that have not a strong detrimental action on the required properties, more particularly on transparency). So the presence of $CeO_2$ is (quasi) excluded (the composition of the glass-ceramics generally includes no $CeO_2$), also the significant presence of $B_2O_3$ (the composition of the glass-ceramics generally includes no $B_2O_3$).

In reference to the strain point of the glass-ceramics, their composition advantageously comprise more than 55% by weight of $SiO_2$ and within said composition, the molar ratio $(R_2O+RO)/Al_2O_3$ is between 0.5 to 1.5, $R_2O$ being the sum of the moles of alkali oxides and RO the sum of the moles of alkaline earth oxides plus ZnO. Glass-ceramics with such composition have a high strain point, of generally at least 875° C. (at least 900° C.).

$Al_2O_3$ is one of the main component of the crystals. It can be present at a minimum amount to ensure sufficient crystallization and not at a too high amount to then produce an unacceptable devitrification of mullite, hence the above indicated preferred range.

ZnO and MgO are also constituents of the crystals. Therefore a minimum amount can be incorporated. At a too high level, MgO is detrimental for transparency. The above indicated preferred values take that into account.

BaO stays in the residual glass. It has been observed that it helps in having a good transparency but its amount has to be limited to keep enough crystallinity and a high strain point, hence the above indicated preferred range.

The man skilled in the art has now realized the great interest of the glass-ceramics disclosed herein.

The precursor glass as well as the glass-ceramics are environmentally free (are arsenic and antimony free). The precursor glass is easily formed.

The glass-ceramics are transparent and display a high transmission above 400 nm which, combined with a high strain point, more particularly makes them suitable as superstrate for photovoltaic cells.

Some of the glass-ceramics are more particularly suitable to support the high temperature growth of a monocrystalline or polycrystalline semiconductor layer. Such growth may consist in the epitaxial thickening of a seed layer formed on the glass-ceramic material. The seed layer may be a large grain polycrystalline silicon layer formed by Aluminum Induced Crystallization or Aluminum Induced Layer Exchange (O. Nast, T. Puzzer, L. M. Koschier, A. B. Sproul, S. R. Wenham, Appl. Phys. Lett. 73 (1998) 3214), or may be a monocrystalline silicon layer (WO 2008/121262). The epitaxial thickening of such layers is advantageously performed at temperatures above 800° C., and more advantageously performed at temperatures above 1000° C. (I. Gordon et al., Solar Energy Materials & Solar Cells 94 (2010) 381-385). Another means of achieving a high quality polycrystalline silicon layer is to perform a high temperature rapid thermal annealing step of a previously grown polycrystalline silicon layer (B. Rau et al., Materials Science and Engineering B 159-160 (2009) 329-332).

Photovoltaic cells usually include at least one transparent conductive layer located between the superstrate and the at least one semiconductor absorber layer. Such a transparent conductive layer allows the collection of the charge carriers generated in the semiconductor absorber layer, while allowing most of the photons to reach the semiconductor absorber layer. The transparent conductive layer may be a transparent conductive oxide layer, or more advantageously, in the case of an epitaxial thickening of a seed layer, may be the seed layer itself in the event that it is a highly doped layer. The transparent conductive layer usually has significant absorption below a wavelength of 400 nm, which does not result in the generation of collectable charge carriers. Therefore a superstrate should preferably have a high transmission for wavelengths above 400 nm. In the preferred case of an epitaxially thickened seed layer, where the seed layer also acts as the conductive layer, this semi-transparent conductive layer usually has significant absorption up to a wavelength of about 450 nm. In this case, a superstrate should preferably have a high transmission for wavelengths above 450 nm. In this way the glass-ceramics of the invention are particularly suitable as superstrates for photovoltaic cells.

According to its second subject-matter, the present disclosure relates to alumino-silicate glass materials which are precursor of the glass-ceramic materials described above. Such glass materials advantageously have the compositions indicated above (for the glass-ceramics). Within said compositions, the level of zirconium oxide can be kept at a low enough level to limit devitrification. The co-presence of $TiO_2$ and $ZrO_2$ allows the requirements to be satisfied.

The present invention also relates to articles made of glass-ceramic materials described above. Such glass-ceramic articles may present any shape and may be aimed to any use. Advantageously, they consist in a sheet. Such sheets generally have a thickness in the range of 0.5 to 4 mm. Such sheets are advantageously used as support (substrate) for semiconductor thin films.

According to a further embodiment, the present disclosure relates to a method for manufacturing an article made of a glass-ceramic material as described above. Said method successively includes melting of a batch mixture of raw materials able to vitrify, said batch mixture containing $SnO_2$ as refining agent, followed by refining of the molten glass obtained, cooling of the refined molten glass obtained, and simultaneously forming it into a desired form for the targeted article, and ceramming of said formed glass, said batch mixture being a precursor of a glass-ceramic material as described above.

Said method is characteristically carried out with a suitable mineral batch mixture (including $SnO_2$ as fining agent, $TiO_2$ and $ZrO_2$ as nucleating agents and less than 100 ppm of $Fe_2O_3$, advantageously in the amounts as more precisely described above) and with a suitable heat-treatment which provides a spinel glass-ceramic.

The ceramming treatment generally comprises the two steps: a nucleation step (in the 700-850° C. range) and a step of crystal growth (in the 850-1050° C. range). At least one hour is required for each of these steps.

The forming step of said method is advantageously carried out to produce a sheet. Thus, it very advantageously consists in rolling (between rollers) or in a float process. The produced sheet generally has a thickness of 0.5 to 4 mm.

Any sheet produced by the above method, more generally any sheet in a glass-ceramic, is opportunely a part of a structure including, further to said sheet, at least one layer made of a semi-conductor (arranged on said sheet). Such a structure constitutes a further subject-matter.

Lastly, the disclosure relates to electronic and optoelectronic devices comprising such a structure (glass-ceramic sheet+at least one layer made of a semi-conductor). Such devices may consist in a photovoltaic device, a flat panel display device, a liquid crystal display device. Said list is in no way exhaustive.

The man skilled in the art has understood the great advantage of the spinel glass-ceramic materials. They are transparent, free of $As_2O_3$ and $Sb_2O_3$, easy to obtain and can also be able to withstand high temperature. So they are able to constitute perfect support for crystalline silicon thin films.

The present invention is now illustrated, in a non limitative way, by the following examples (1 to 6) Said examples may be compared to given comparative examples (A to D).

The present disclosure is also illustrated by the annexed FIGURE which shows the complete transmission curves (as a function of the wavelength) of some of these comparative examples (A and B) and examples (1 and 3).

EXAMPLES

The raw materials, in proportions (weight proportions expressed as oxides) copied out in the first part of Table 1 hereafter, have been mixed carefully for producing batches of 1 kg of precursor glass. It has to be noted that said raw materials includes impurities (as traces), more particularly traces of $Fe_2O_3$.

The mixtures have been placed (for melting and refining) in platinum crucibles and melted 4 h at 1650° C.

After melting the glasses have been rolled to a thickness of 6 mm and annealed 1 h at 720° C.

Ceramming was then performed according to the following cycle:
- heating to 800° C. in 150 min;
- maintaining at 800° C. for 120 min;
- heating to 1000° C. in 40 min;
- maintaining at 1000° C. for 240 min.

The transmission measurements have been performed on 1 mm thick polished samples with a spectrophotometer equipped with an integrating sphere (this allows to measure the total, i.e. direct+diffuse, transmission). The lines "T 80%", "T 85%" and "T 90%" (of the second part Table 1 hereafter) give the wavelengths (in nm) at which the transmission values of 80%, 85% and 90% are respectively reached. The lower values are better.

The liquidus temperatures have been measured on pieces of the precursor glasses with a volume around 0.5 cm³. These pieces were submitted to the following treatment:
- introduction in the furnace preheated at 1550° C.;
- maintenance at 1550° C. for 30 min;
- the temperature is decreased to the test temperature, at 10° C./min;
- maintenance at the test temperature for 17 h;
- air quenching of the samples.

The presence of crystals is studied by optical microscopy. In Table 1 hereafter, a temperature range (and the associated viscosity range) is given as liquidus. The maximum temperature corresponds to the minimum temperature of test at which no crystal was observed; the minimum temperature corresponds to the maximum temperature of test at which crystals were observed. The nature of crystalline phase which devitrifies at the liquidus temperature is also indicated.

Strain points were measured by beam bending viscosimetry.

The linear coefficient of thermal expansion (CTE) over the temperature range 25-300° C. was measured by dilatometry.

Examples A, B, C and D do not belong to the invention. They are comparative examples.

The glass of comparative example A contains $As_2O_3$. It is a glass according to U.S. Pat. No. 5,968,857.

The glass of comparative example B has quasi the same composition as the one of the glass of comparative example A. However, its composition is free of $As_2O_3$. As explained above, it displays a low transmission.

The glass of comparative example C does not contain arsenic but a lower titanium level than the glass of comparative example B. Its transmission is higher but still low.

The glass of comparative example D contains a lower level of iron than the one of comparative example C. It displays a higher transmission but still much lower than the one of comparative example A (with $As_2O_3$).

Examples 1-6 are inventive. Example 1 is preferred.

The annexed FIGURE clearly evidences that the transmission of example B is low and that transmission of examples A, 1 and 3 is higher than 80% for any wavelength above 450 nm and higher than 85% for any wavelength higher than 520 nm. It also shows that the transmission of example 1 is especially interesting with a transmission higher than 80% for any wavelength higher than 400 nm.

What is claimed is:

1. A transparent glass-ceramic material containing a spinel solid solution as the main crystalline phase, having a coefficient of thermal expansion of $30\text{-}40 \times 10^{-7} K^{-1}$ over a temperature range of 25-300° C. and a composition that is
   - free of $B_2O_3$, $As_2O_3$ and $Sb_2O_3$, with the exception of unavoidable trace thereof, and
   - comprises $SnO_2$, $TiO_2$ and $ZrO_2$, and less than 100 ppm of $Fe_2O_3$,
   - wherein the composition, expressed in percentages by weight of oxides, comprises:
     - 0.1-2% of $SnO_2$,
     - 2-4% of $TiO_2$, and
     - 3-4.5% of $ZrO_2$.

TABLE 1

| Examples | A | B | C | D | 1 | 2 | 3 | 4 | 5 | 6 |
|---|---|---|---|---|---|---|---|---|---|---|
| Composition (wt %) | | | | | | | | | | |
| $SiO_2$ | 59.00 | 59.30 | 60.28 | 60.04 | 60.25 | 59.47 | 59.72 | 59.22 | 58.97 | 59.31 |
| $Al_2O_3$ | 19.00 | 19.10 | 19.41 | 19.33 | 19.40 | 19.13 | 19.23 | 19.23 | 18.97 | 19.10 |
| ZnO | 8.95 | 9.00 | 9.15 | 9.11 | 9.15 | 9.08 | 9.06 | 9.06 | 9.00 | 9.07 |
| MgO | 2.49 | 2.50 | 2.54 | 2.53 | 2.54 | 2.52 | 2.52 | 2.52 | 2.50 | 2.51 |
| BaO | 2.09 | 2.11 | 2.14 | 2.13 | 2.14 | 3.39 | 2.12 | 2.12 | 3.36 | 3.39 |
| $TiO_2$ | 4.97 | 5.00 | 3.43 | 3.42 | 2.35 | 2.30 | 2.33 | 2.33 | 2.28 | 3.40 |
| $ZrO_2$ | 2.98 | 2.99 | 3.05 | 3.04 | 3.95 | 3.87 | 3.92 | 3.92 | 3.84 | 3.02 |
| $SnO_2$ | 0.00 | 0.00 | 0.00 | 0.00 | 0.22 | 0.22 | 1.10 | 1.60 | 1.08 | 0.20 |
| $As_2O_3$ | 0.50 | 0.00 | 0.00 | 0.00 | 0.00 | 0.00 | 0.00 | 0.00 | 0.00 | 0.00 |
| $SO_3$ | | | | 0.4 | | | | | | |
| $Fe_2O_3$ (ppm) | 80 | 80 | 80 | 44 | 44 | 44 | 44 | 44 | 44 | 44 |
| (RO*/$Al_2O_3$) | 0.99 | 0.99 | 0.99 | 0.99 | 0.99 | 1.05 | 0.99 | 0.99 | 1.05 | 0.93 |
| Properties | | | | | | | | | | |
| Transmission | | | | | | | | | | |
| T at 400 nm % | 82.8 | 72.8 | 76.7 | 82.7 | 81.6 | 83 | 65.8 | 57.8 | 70.9 | 78.6 |
| T 80% (nm) | 395 | 739 | 500 | 373 | 395 | 387 | 432 | 445 | 426 | 407 |
| T 85% (nm) | 410 | 961 | 655 | 535 | 426 | 419 | 469 | 495 | 477 | 508 |
| T 90% (nm) | 744 | 1350 | 1116 | 1099 | 726 | 697 | 756 | 837 | 801 | 960 |
| Devitrification | | | | | | | | | | |
| Liquidus | 1421-1435° C. (940-1130 dPa · s) Mullite | | | | 1442-1460° C. (1000-1250 dPa · s) Zircon | 1430-1447° C. Zircon | 1449-1469° C. (1270-1620 dPa . s) Zircon | | 1445-1461° C. Zircon | 1430-1449° C. (970-1240 dPa . s) Mullite |
| Strain point | 925° C. | | | 955° C. | 935° C. | 894° C. | | | 890° C. | |
| CTE ($10^{-7} K^{-1}$) | | | | | 36 | | | | | |

*RO = MgO + BaO + ZnO (mol %)

2. The glass-ceramic material according to claim 1, wherein the composition, expressed in percentages by weight of oxides, essentially consists of:

| | |
|---|---|
| $SiO_2$ | 45-65 |
| $Al_2O_3$ | 14-28 |
| ZnO | 4-13 |
| MgO | 0-8 |
| with ZnO + MgO | ≥8 |
| BaO | 0-8 |
| $SnO_2$ | 0.1-2 |
| $TiO_2$ | 2-4 |
| $ZrO_2$ | 3-4.5 |
| $Fe_2O_3$ | <100 ppm. |

3. The glass-ceramic material according to claim 2, wherein the composition comprises more than 55% by weight of $SiO_2$ and in that, within said composition, the molar ratio $(R_2O+RO)/Al_2O_3$ is between 0.5 to 1.5, $R_2O$ being the sum of the moles of alkali oxides, and RO the sum of the moles of alkaline earth oxides plus ZnO.

4. The glass-ceramic material according to claim 1, wherein the composition, expressed in percentages by weight of oxides, comprises 0.15 to 0.8 wt. % of $SnO_2$ and/or 2 to 3 wt. % of $TiO_2$.

5. The glass-ceramic material according to claim 1, wherein the composition comprises less than 80 ppm of $Fe_2O_3$.

6. A glass-ceramic article made of a glass-ceramic material according to claim 1.

7. The article according to claim 6 wherein the article comprises a glass-ceramic sheet.

8. A method for manufacturing a glass-ceramic article according to claim 6, said method comprising
melting a batch mixture of raw materials able to vitrify to form a molten glass, said batch mixture containing $SnO_2$ as refining agent,
refining the molten glass to form a refined molten glass,
cooling the refined molten glass and simultaneously forming it into a desired form, and
ceramming the form.

9. The method according to claim 8, wherein the forming comprises rolling or a float process to produce a sheet.

10. A structure comprising a sheet made of a glass-ceramic according to claim 7, said structure further comprising at least one layer made of a semiconductor formed on said sheet.

11. An electronic or optoelectronic device comprising a structure according to claim 10.

12. The device according to claim 11 comprising a photovoltaic device, a flat panel display device or a liquid crystal display device.

* * * * *